Jan. 9, 1940.  A. S. MITCHELL ET AL  2,186,838
APPARATUS AND METHOD FOR MANUFACTURING UPHOLSTERY TRIM PANELS
Filed Feb. 1, 1937  8 Sheets-Sheet 1
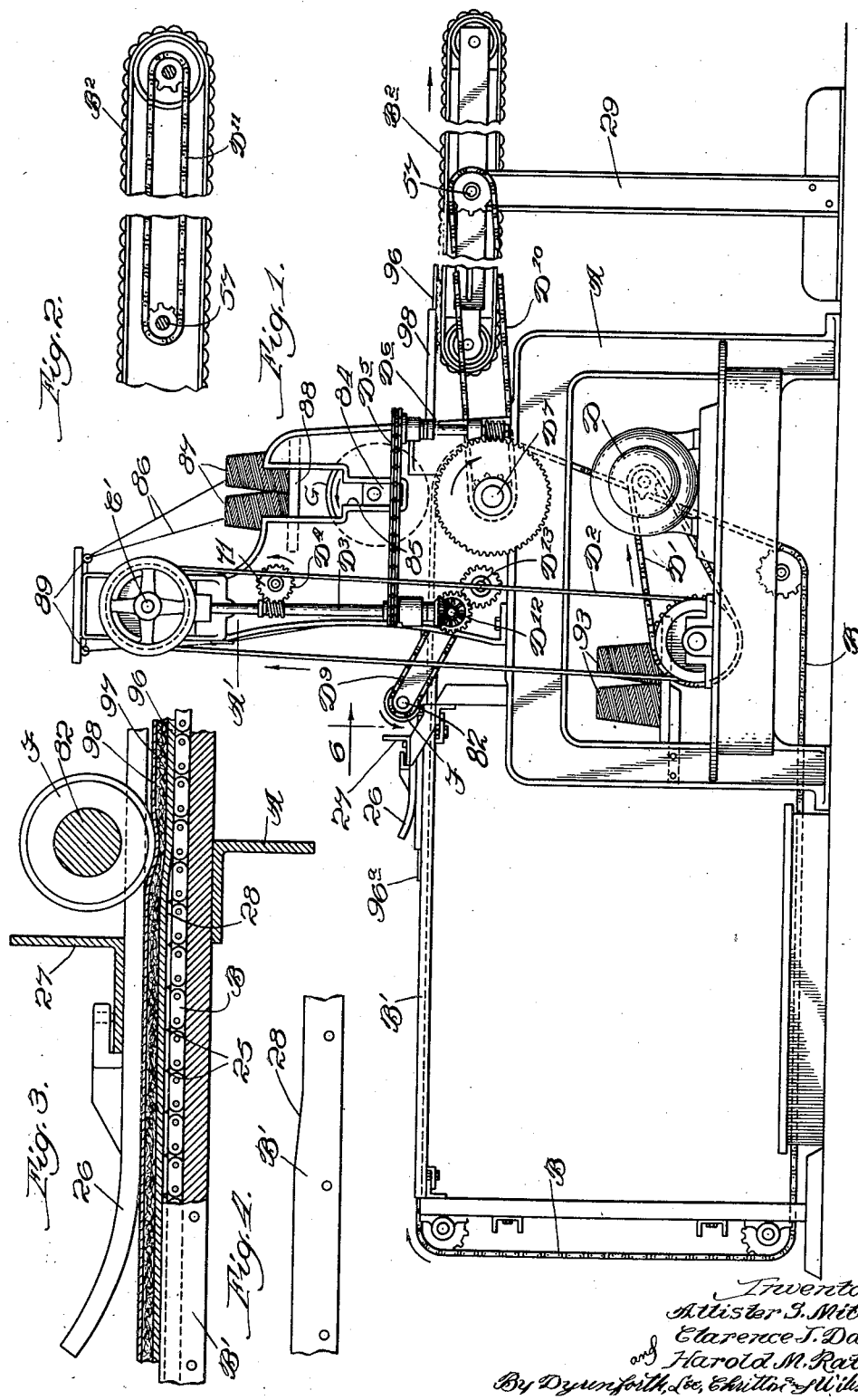
Inventors:
Allister S. Mitchell,
Clarence J. Davies
and Harold M. Ratley.
By Dynrenforth, Lee, Chritton & Wiles, Attys.

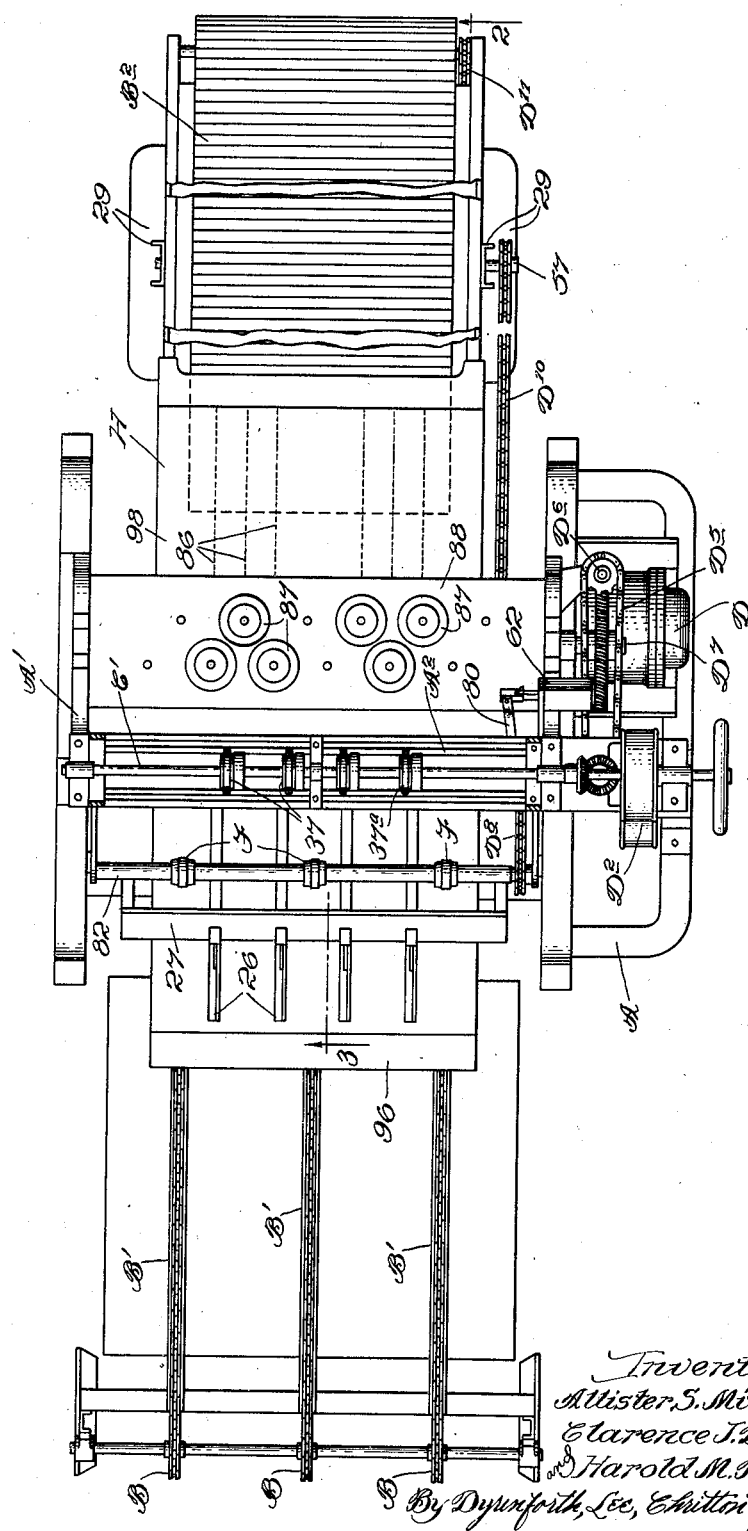

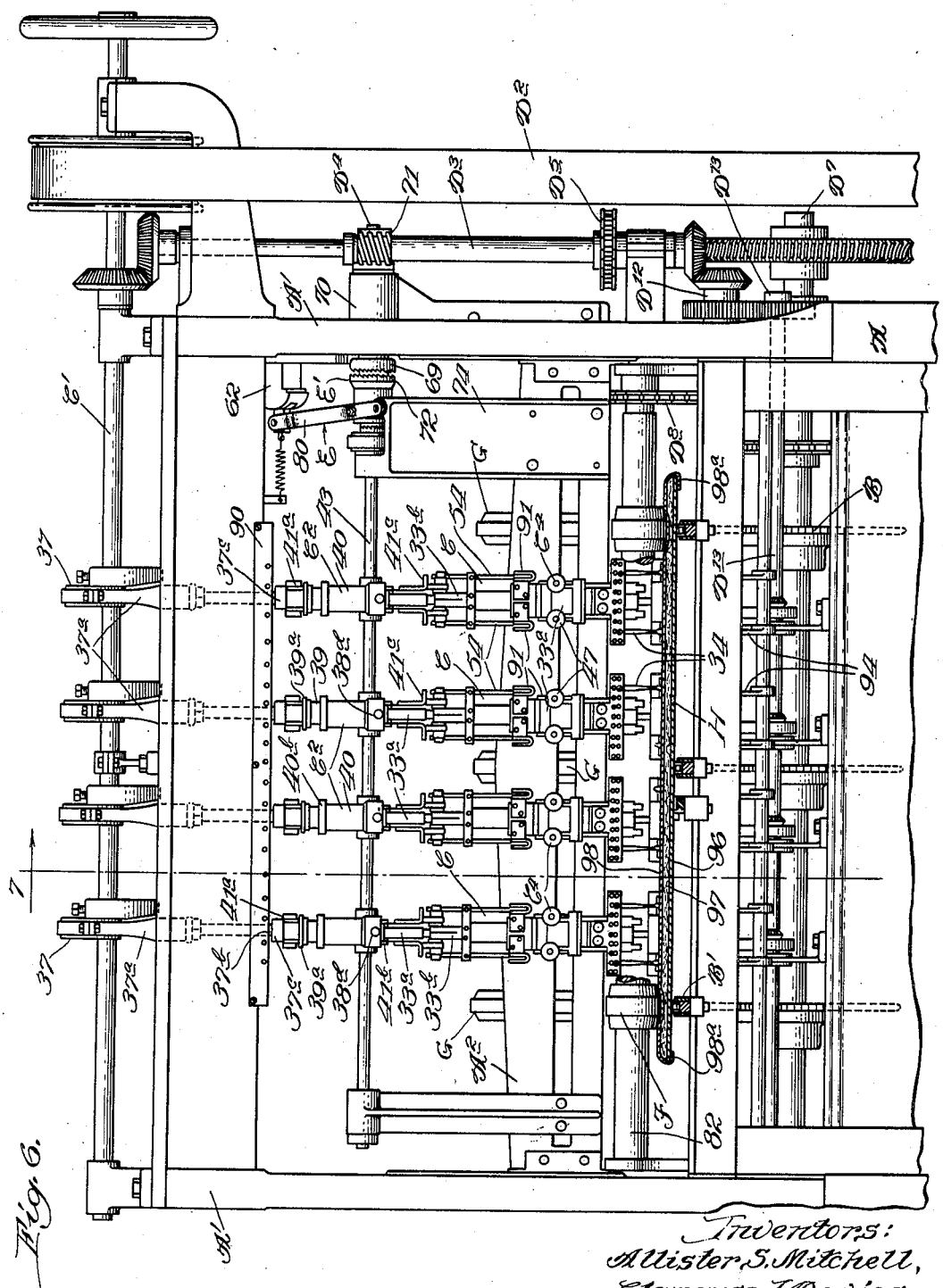

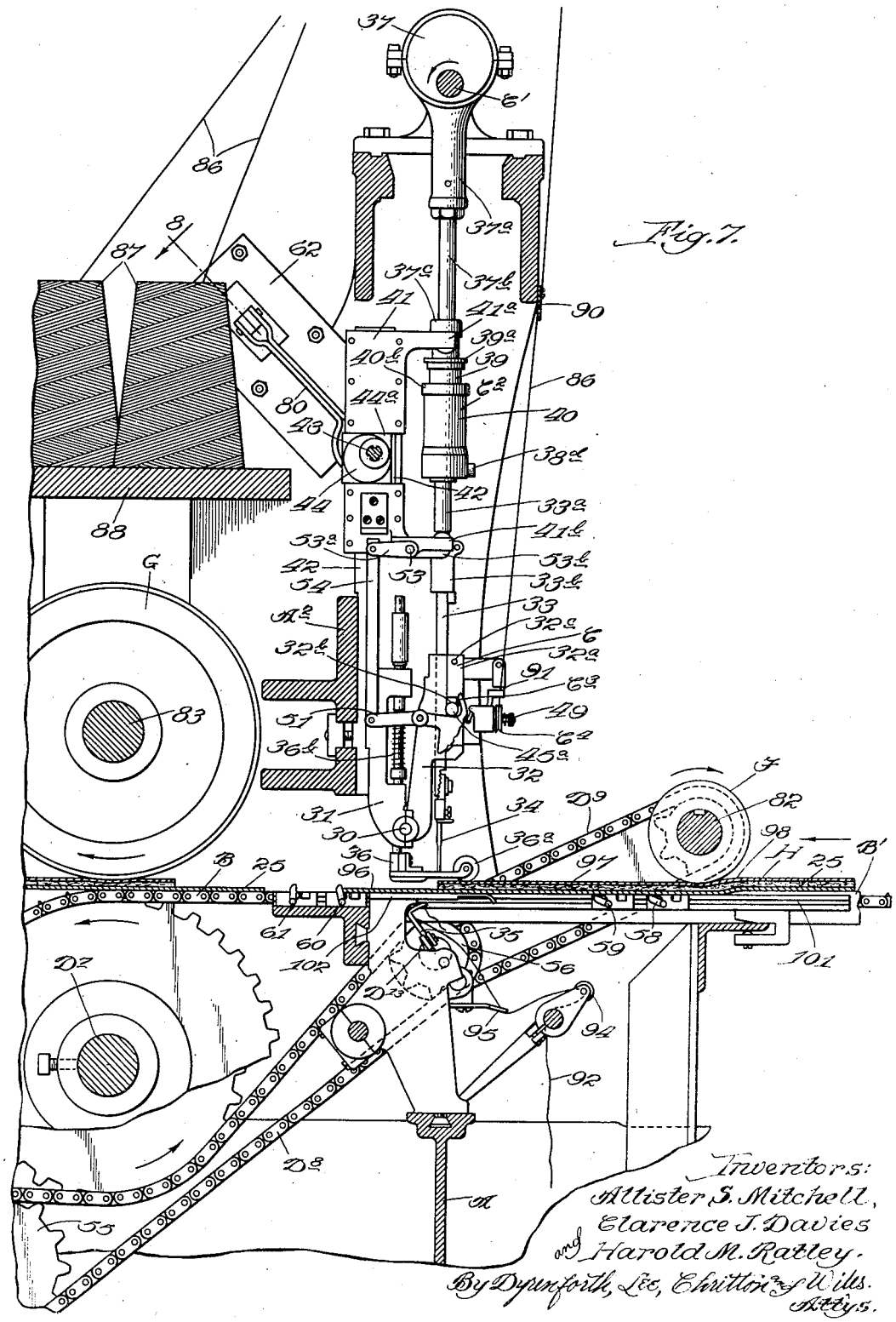

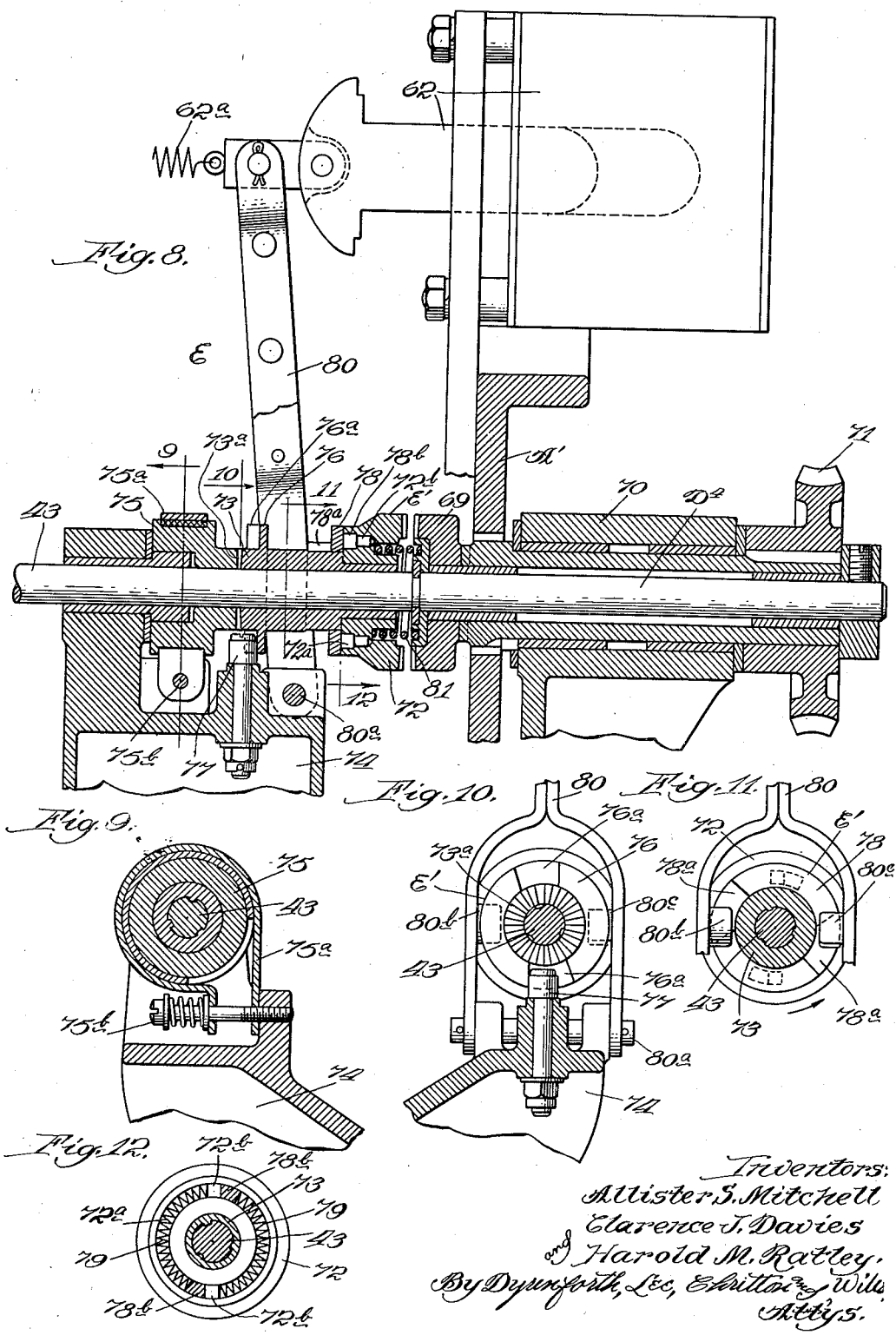

Jan. 9, 1940. A. S. MITCHELL ET AL 2,186,838
APPARATUS AND METHOD FOR MANUFACTURING UPHOLSTERY TRIM PANELS
Filed Feb. 1, 1937 8 Sheets-Sheet 6
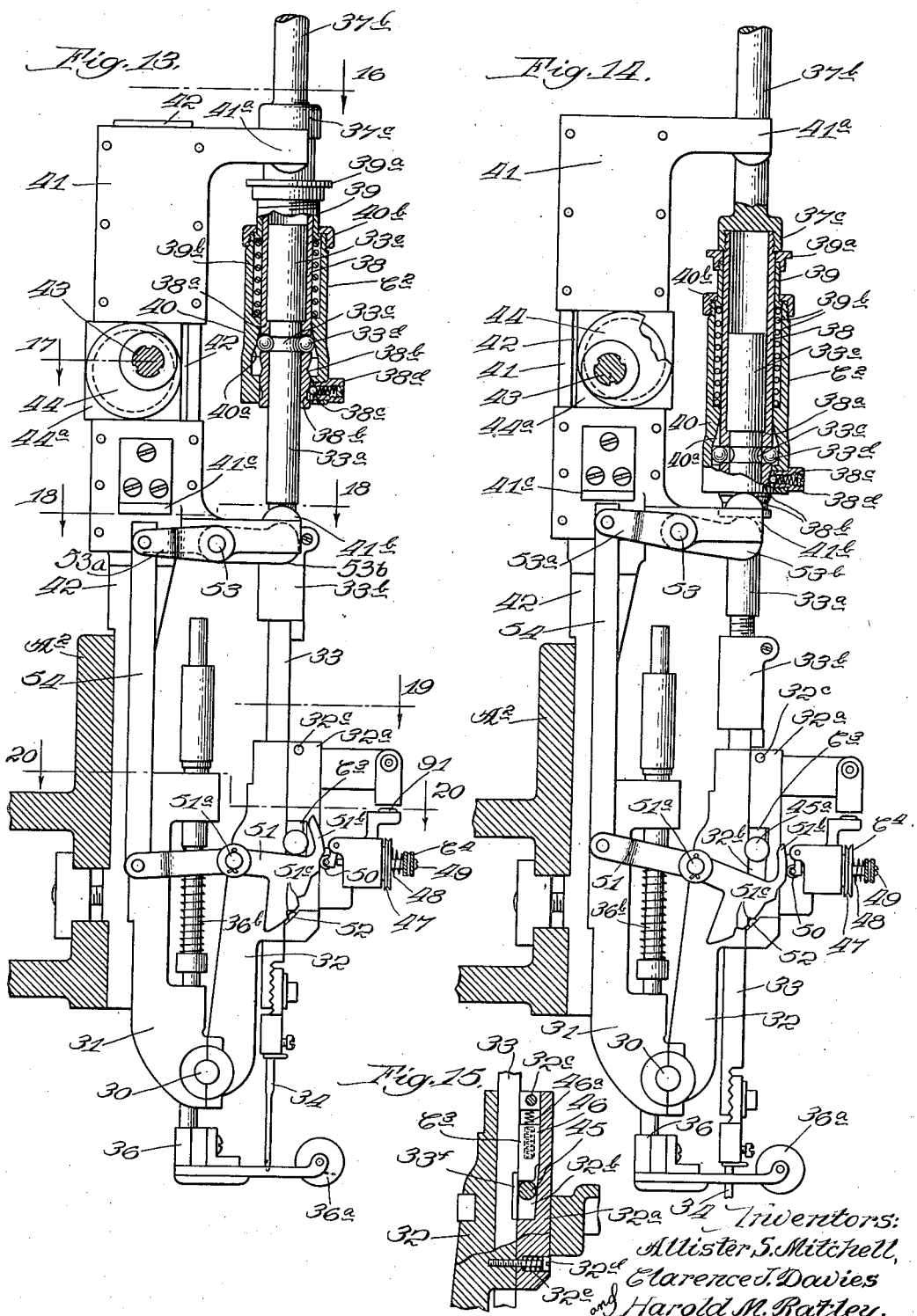

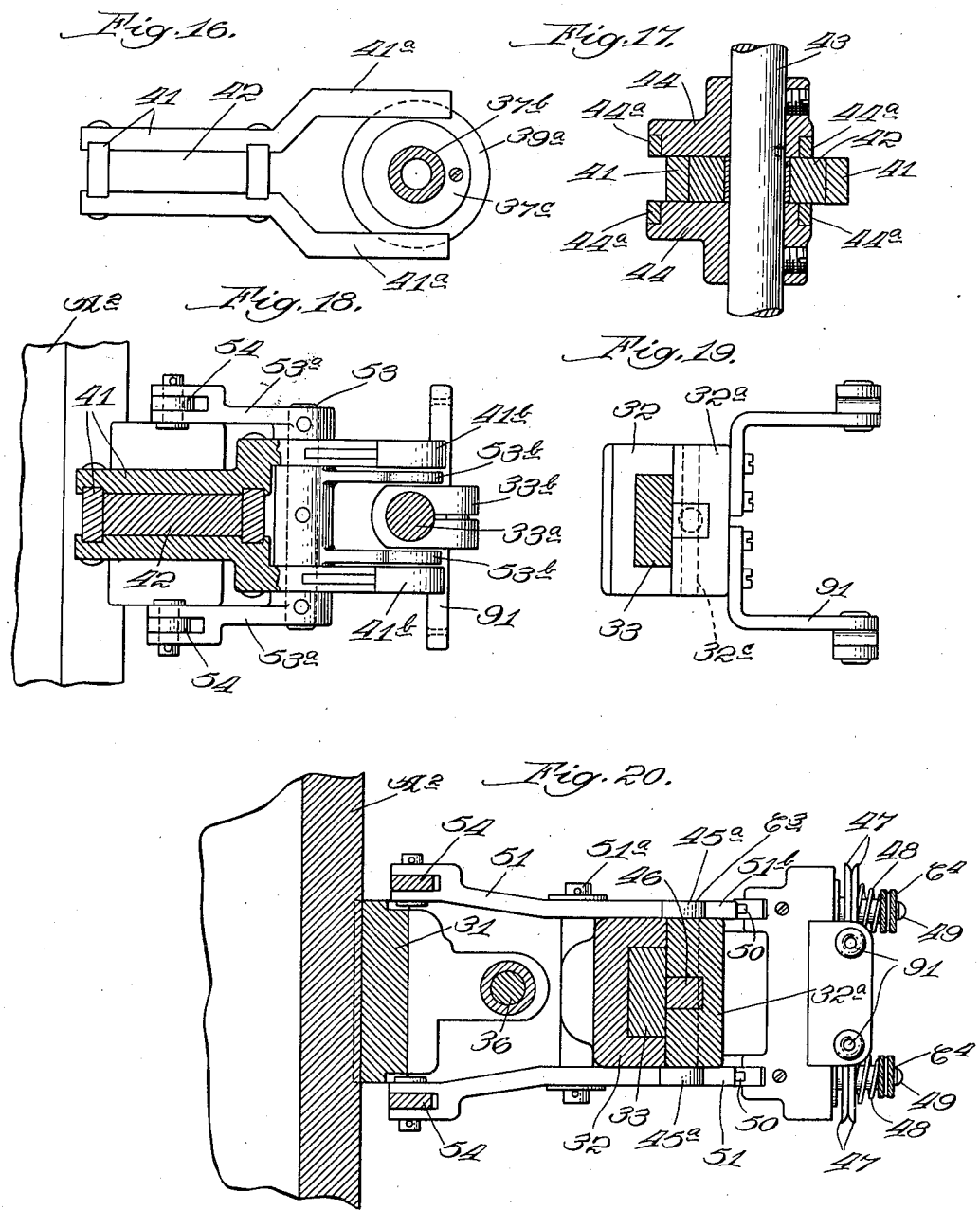

Jan. 9, 1940.   A. S. MITCHELL ET AL   2,186,838
APPARATUS AND METHOD FOR MANUFACTURING UPHOLSTERY TRIM PANELS
Filed Feb. 1, 1937   8 Sheets-Sheet 8
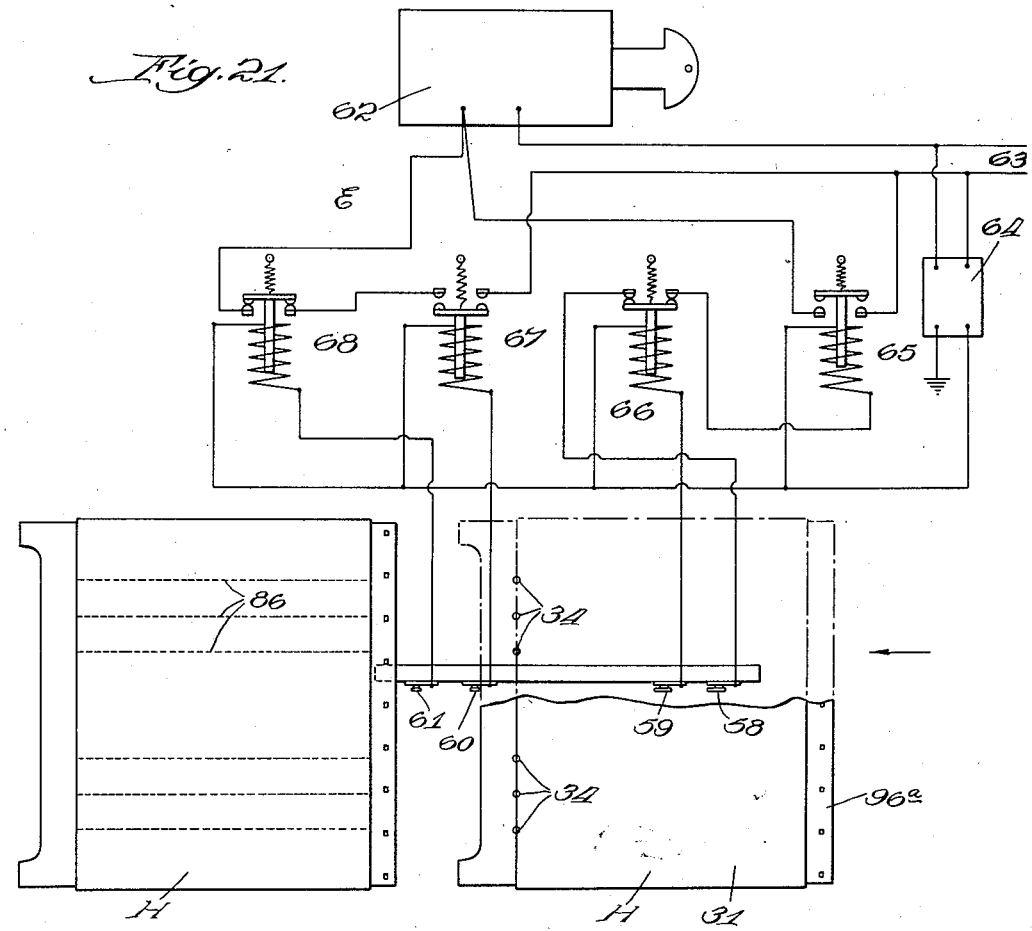
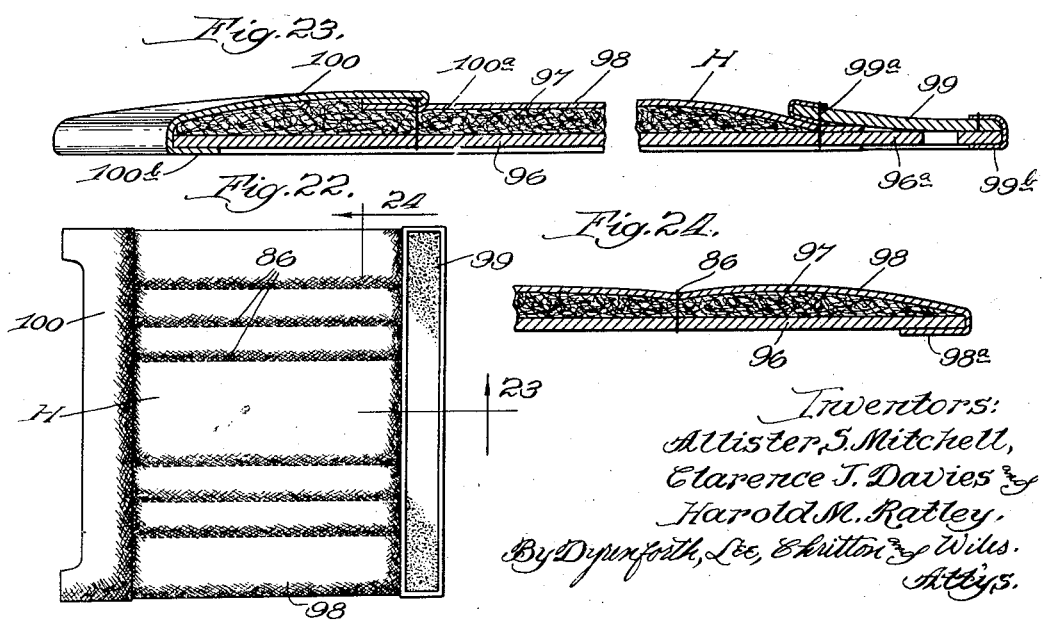

Patented Jan. 9, 1940

2,186,838

UNITED STATES PATENT OFFICE 2,186,838

APPARATUS AND METHOD FOR MANUFACTURING UPHOLSTERY TRIM PANELS

Allister S. Mitchell, Clarence J. Davies, and Harold M. Ratley, Detroit, Mich., assignors to National Automotive Fibres, Inc., Detroit, Mich., a corporation of Delaware Application February 1, 1937, Serial No. 123,538

9 Claims. (Cl. 112—2)

This invention relates particularly to apparatus for the manufacture of improved trim panels, such as are used for interior trim in automobile bodies.

The primary object of the invention is to provide improved apparatus and an improved method for sewing upholstery material to panel-plates.

Heretofore, sewing machines have been provided having a transverse series of sewing heads which are adapted to sew upholstery fabrics to the panel-plates, which are usually made of stiff paper or cardboard, but the lines of stitching extended from one edge of the panel-plate to the other, causing undesirable lines of weakening. One of the objects of the present invention is to provide mechanism which will enable the sewing to be skipped in the marginal portions of the panel-plate, when passing through the machine, thereby avoiding undue weakening of the panel-plate. A further advantage is attained in avoiding sewing through the board at a margin, in cases where the margin is not covered.

A further object of the invention is to provide mechanism for holding the sewing needles in retracted position while certain portions of the panel-plate are passing the needles.

A further object of the invention is to provide mechanism for disconnecting the driving engagement of the sewing needles from the driving mechanism during the period that the needles are retracted from sewing engagement with the panels.

A further object of the invention is to provide control means for the sewing mechanism which is controlled automatically by the panel-plates, which are advanced by suitable conveyors.

Another object of the invention is to provide an improved clutch mechanism for driving an eccentric one-half a revolution and stopping and locking the eccentric in position during the period between operations. The clutch is part of the control mechanism which, in turn, is controlled automatically by the trim-panels, preferably.

The invention is illustrated in a preferred embodiment in the accompanying drawings, in which—

Fig. 1 is a broken side elevational view of a machine embodying the invention; Fig. 2, a broken longitudinal sectional view, taken as indicated at line 2 of Fig. 5; Fig. 3, a broken longitudinal sectional view, taken as indicated at line 3 of Fig. 5; Fig. 4, a broken elevational view of one of the guide channels for a conveyor chain; Fig. 5, a broken plan view of the machine; Fig. 6, a broken elevational view of the machine showing the sewing heads; Fig. 7, a broken longitudinal sectional view, taken as indicated at line 7 of Fig. 6; Fig. 8, a broken sectional view of the solenoid-operated clutch mechanism, taken as indicated at line 8 of Fig. 7; Fig. 9, a fragmentary sectional view, taken as indicated at line 9 of Fig. 8; Fig. 10, a fragmentary sectional view, taken as indicated at line 10 of Fig. 8; Fig. 11, a fragmentary sectional view of the clutch head, taken as indicated at line 11 of Fig. 8; Fig. 12, a sectional view, taken as indicated at line 12 of Fig. 8; Fig. 13, a fragmentary elevational view, partly in section, showing a portion of the sewing mechanism in sewing position; Fig. 14, a view similar to Fig. 13, but showing the mechanism in collapsed position, wherein the needle bar is disconnected from driving engagement with the operating plunger; Fig. 15, a fragmentary sectional view of the roller-wedge mechanism for locking the needle-bar in retracted position; Fig. 16, a plan sectional view, taken as indicated at line 16 of Fig. 13; Fig. 17, a sectional view of the eccentric device, taken as indicated at line 17 of Fig. 13; Fig. 18, a plan sectional view, taken as indicated at line 18—18 of Fig. 13; Fig. 19, a sectional view, taken as indicated at line 19 of Fig. 13; Fig. 20, a plan sectional view, taken as indicated at line 20—20 of Fig. 13; Fig. 21, a diagrammatic view of a wiring plan of the electrical mechanism for operating a master solenoid; Fig. 22, a plan view of a completed trim-panel; Fig. 23, a sectional view of the trim-panel, taken as indicated at line 23 of Fig. 22; and Fig. 24, a sectional view of the trim-panel, taken as indicated at line 24 of Fig. 22.

In the embodiment illustrated, A designates a main frame provided with vertical standards A' and cross bars A²; B endless chain conveyers which travel through guide channels B' and carry the trim-panels forwardly to an endless belt conveyer B²; C, sewing heads mounted on the cross bars A² and driven by a common shaft C' through couplers C², said sewing heads having locking devices C³ for holding the sewing needles in retracted position and being further provided with thread-tensioning devices C⁴; D, drive mechanism for the various parts of the machine; E, control mechanism including a solenoid-operated clutch E' for enabling the operation of the sewing heads to be controlled automatically by movement of the trim-panels; F, rear feed rollers for pressing the trim-panels against the conveyers B; G, idler presser rolls in front of the sewing mechanism; and H, trim-panels.

The frame A and most of the sewing machine is of standard commercial equipment and need not be described in detail but as shown in Figs. 1, 5 and 6 the main frame A is provided with fixed vertical standards A' which are connected by means of cross bars A² and support the sewing-mechanisms.

The chain conveyers B, best shown in Figs. 1 and 5, travel in an endless circuit from the bottom of the machine, around the back and through channels B'. As shown in Fig. 3, the conveyers are provided with pins 25 which are adapted to engage the trim-panels H and assure positive forward feeding of the same. As shown in Fig. 4, the rear portions of the channel members B' are sufficiently high to prevent contact with the panel members until the latter have passed under shoes 26 which are supported on a cross bar 27. The upper edges of the channel members taper downwardly as indicated at 28 to enable the rear feed rolls F to press the trim-panels into engagement with the pins 25, as explained above. At the front or delivery end of the machine is provided an endless belt conveyer B² which is supported on a standard 29 so as to receive and remove the trim-panels after the sewing operation.

The sewing heads C, best shown in Figs. 6, 7, 13 and 14 are pivotally supported at their lower end on a shaft 30 in a bracket 31 which is secured to the cross bar A². Each head is provided with a rocking guide member 32 in which is slidably mounted a needle-bar 33 having one or more vertically adjustable sewing needles 34. The sewing needle is adapted to pierce the trim-panel H and cooperate with an oscillating looper-needle 35, disposed beneath the bed plate to form a semi-lock chain stitch in the well-known manner. A presser foot 36, provided at its rear end with a roller 36ᵃ, is slidably mounted in the bracket 31 and is provided with a spring 36ᵇ to enable it to compress the fabrics passing beneath the reciprocating sewing needle.

The needle-bar 33 is reciprocated by means of an eccentric 37 on the shaft C' and the eccentric also provides a slight rocking movement about the shaft 30. As shown in Fig. 7, the eccentric is surrounded by a yoke 37ᵃ on which is mounted a rod 37ᵇ provided at its lower end with an internally threaded socket 37ᶜ. To the upper end of the needle bar 33 is adjustably connected a plunger 33ᵃ by means of a clamp 33ᵇ.

Releasable driving connections between the members 33ᵃ and 37ᶜ are provided by the coupler C². As shown in Figs. 13 and 14, the plunger 33ᵃ is provided with an annular groove 33ᶜ into which may be thrust balls 33ᵈ. A cylinder like member 38 is provided at its lower end with a shoulder 38ᵃ adapted to engage the enlarged piston like head 33ᵉ and limit its downward travel. The member 38 is threaded to the socket 37ᶜ at its upper end and its lower end is provided with a plurality of apertures for the balls 33ᵈ. The lower end of the member 38 is provided with two vertically spaced annular grooves 38ᵇ which are adapted to be engaged by a spring-pressed ball 38ᶜ provided in a hollow stud 38ᵈ. A sleeve 39 provided at its upper end with a flange member 39ᵃ is slidably mounted on the member 38 and is urged upwardly thereon by means of a compression spring 39ᵇ. Another sleeve member 40 provided with an internally tapered groove 40ᵃ is slidably mounted on the member 38 and the sleeve member 39, and its downward travel on the member 39 is limited by a flange 40ᵇ. The tapered groove enables the member 40 when moved to the position shown in Fig. 13, to force the balls 33ᵈ into engagement with the groove 33ᶜ so that the rods 33ᵃ and 37ᵇ are locked together. However, if the member 40 is moved upwardly on the member 38, the balls are free to move outwardly and the head 33ᵉ is free to reciprocate within the cylinder 38. The spring-pressed ball 38ᶜ is carried by the member 40 and serves to hold the member 40 yieldingly in either the locking or unlocking position. The member 39 and the spring 39ᵇ serve as impact members so that when it is desired to lock the coupler from the position shown in Fig. 14 to that shown in Fig. 13, it is merely necessary to depress the flange 39ᵃ which will urge the sleeve 40 downwardly to the lower notch 38ᵇ as soon as the groove 33ᶜ arrives at a position to receive the balls 33ᵈ. On the other hand, to unlock the device, it is merely necessary to strike the lower end of the sleeve 40 to move it into its upper position where the balls will be free to move outwardly and unlock the device.

The coupler is moved from locked to unlocked position and back again by means of a yoke 41 which has upper arms 41ᵃ and lower arms 41ᵇ to engage flange 39ᵃ and the lower end of the cylinder 40, respectively. The yoke is slidably mounted on an upright 42 which serves as a bearing for eccentric shaft 43 on which is fixedly mounted eccentrics 44 which rotate within slide blocks 44ᵃ and thereby raise or lower the yoke when the shaft 43 is rotated.

A roller wedge device C³ is provided to hold the needle-bar 33 in its upper position as shown in Figs. 13–15. A cover like member 32ᵃ is provided on the guide block 32 and is provided with a wedge-shaped slot 32ᵇ, in which is mounted a roller 45 provided with a head 45ᵃ. A slide block 46 is yieldingly urged downwardly by a spring 46ᵃ against the roller 45 urging the latter to locking position.

The upper end of the cover member 32ᵃ is pivotally connected to the guide block 32, as indicated at 32ᶜ, and its lower end is yieldingly held against the guide-block by means of a cap screw 32ᵈ provided with a compression spring 32ᵉ so that the locking engagement is somewhat yielding. As shown in Fig. 15, the needle-bar is provided with a hard steel insert 33ᶠ to reduce the amount of wear. In operation the needle-bar is drawn to its uppermost position by the shoulder 38ᵃ pulling up the head 33ᵉ. During this movement, the roller 45 is urged downwardly by the block 46 and the bar is thereby locked in retracted position. This happens immediately after the driving mechanism has been disconnected by the coupler so that the wedge device merely supports the needle-bar assembly.

Each of the sewing heads is provided with a pair of thread tensioning devices C⁴. As shown in Fig. 14, each device has a pair of disks 47 which are lightly pressed together by means of a compression spring 48 whose outer end engages the head of a hollow pin 49. A roller arm 50 is pivotally mounted at the inner end of a plunger slidably mounted in the hollow pin so that the tension on thread held between the disks 47 may be relieved by forcing the plunger outwardly. For this purpose the outer disk 47 or a washer engaging this disk is provided with a portion spanning a slot extending from the outer end of pin 49. The slidable plunger engages this portion of the member 47 or the washer, as the case may be. In the event that a washer is employed, this serves to relieve the tension of the spring 48. In the event that the portion spanning the slot is formed on the outer disk 47, motion of the plunger mechanically separates the tension disk.

The roller wedge device C³ and the thread tensioning devices C⁴ are operated by means of a pair of lever arms 51 which are pivotally mounted on guide block 32 by means of a pivot 51ᵃ. The upper front end of the levers is provided with a cam like surface 51ᵇ which is adapted to engage the roller arm 50 to relieve the pressure between the disks 47 when the sewing head is in collapsed position, as indicated in Fig. 14. The front end of each lever is further provided with a pair of notches 51c which are adapted to be engaged alternately by a spring-pressed plunger 52 so that the levers will rest in either locking or unlocking position. The front upper edges of the levers 51 are adapted to engage the heads 45a and unlock the needle-bar when the levers are rocked to the position shown in Fig. 13. Movement of the levers 51 is controlled by a rock shaft 53 which is journalled in the yoke 41 and has a pair of rearwardly extending arms 53a which are connected to the rear ends of the levers 51 by means of links 54. As best shown in Figs. 14 and 18, the rock shaft is further provided with forwardly extending arms 53b disposed between the yoke arms 41b and are adapted to engage the lower end of the member 38 of the rod 37b when the yoke 41 is in proper position. The yoke 41 is further provided with laterally extending stop arms 41c which are adapted to engage the ends of the links 54 and rock the levers 51 to the position in Fig. 13 when the yoke 41 is moved to its lowermost position. The stop arms 41c are fixed to the yoke 41 so that in the collapsed position illustrated in Fig. 14 there will be about five thirty-seconds of an inch clearance between the top of the links 54 and said arms. This clearance is taken up during the first downward movement of the yoke as the links 54 are held in position through the action of plungers 52 on the levers 51. However, as the yoke continues to move downwardly the links 54 are forced down and the levers 51 are pressed into the position shown in Fig. 13, causing the roller-wedge 45 to be raised to release the needle-bar and the plunger 49 is permitted to again apply pressure to the disks 47 to tension the thread.

The drive mechanism D, as shown in Figs. 1, 5, 6 and 7 comprise a motor mounted on the frame A driving a pulley by means of a sprocket chain D', said pulley driving the shaft C' by means of a belt D². A vertical shaft D³ is driven from the shaft C' by means of a pair of bevelled gears and is provided near its center portion with a worm gear which drives a shaft D⁴ to provide power for the clutch E'. The shaft D³ is provided near its lower end with a sprocket wheel which drives another vertical shaft D⁶ by means of a sprocket chain D⁵. A horizontal shaft D⁷ is driven from the shaft D⁶ by means of a worm and gear. As shown in Fig. 7, the shaft D⁷ is provided with a sprocket wheel to drive a sprocket chain D⁸ which passes around a lower idler wheel 55 and up over a double sprocket wheel 56 which, in turn, drives the rear feed rolls F by means of a sprocket chain D⁹. As shown in Figs. 1, 2 and 5, the conveyor B² is also driven from the shaft D⁷ by means of a sprocket chain D¹⁰ which drives a shaft 57 at the central portion of the conveyer and thus power is transmitted to the front end of the conveyer by means of an additional sprocket chain D¹¹. As best shown in Figs. 1 and 6, the lower end of the shaft D³ is provided with bevelled gears to drive a stub shaft D¹², which in turn, drives the looper-needle shaft D¹³.

The control mechanism E has fingers 58, 59, 60 and 61 arranged in the path of the forwardly advancing panels H, as shown in Fig. 7. These fingers through suitable relays and circuits, described below, serve to operate the master solenoid 62 and cause the clutch E' to rotate eccentrics 44 on the shaft 43, one-half a revolution during each operation to actuate the yoke 41, as explained above. The eccentrics 44 are arranged so that the yoke does not normally rest in its uppermost or lowermost position but preferably the eccentrics turn about 50° beyond center so that the arms 41a and 41b will normally be out of contact with the rapidly reciprocating coupler C².

In order to provide rapid and exact movement, the clutch E' is designed to rotate the shaft 43 one-half turn each time it is thrown into engagement with the driving mechanism D⁴ by the master solenoid 62. The wiring diagram for the master solenoid is illustrated in Fig. 21 wherein the trim-panels H advance from right to left. The position of the sewing needles is indicated by the circles 34. The contact fingers 58, 59, 60 and 61 normally ground their circuits but the circuits are opened when the contact fingers are engaged by a trim-panel. Power for the solenoid is obtained from a suitable source indicated at 63 and a transformer 64 supplies current for the solenoid operated switches 65, 66, 67 and 68. As will be understood by reference to the diagram, swtch 65 is adapted to energize the master solenoid 62 and switch 66 is adapted to de-energize the same by interrupting the circuit which holds switch 65 closed. The solenoid may also be energized by a circuit through switches 67 and 68, the switch 67, however, being normally held open by contact finger 60 and switch 68 being normally held closed by contact finger 61.

When a trim panel is placed on the chain conveyers B and fed into the machne it actuates in rotation the contact fingers 58-61, inclusive. As it moves to the left it opens contacts 58 and 59 and holds them open as long as the panel is over them. Upon reaching the position shown at the left of Fig. 21, the panel then opens contact 60 and de-energizes the solenoid of switch 67. The switch 67 is then closed and energizes the master solenoid 62, which in turn, throws in the clutch E' and causes the shaft 43 to make half a revolution.

The panel then advances and opens contact 61 which de-energizes the solenoid of switch 68 and opens the energizing circuit of the master solenoid. When the rear edge of the panel clears contact finger 58, the solenoid of switch 65 is energized and again closes the circuit of the master solenoid to enable it to throw in the clutch and give the shaft 43 another half turn. When the rear edge of the panel clears contact 59, the solenoid of switch 66 is again energized to break the solenoid circuit of switch 65 and thereby de-energize the solenoid. Thus it will be understood that as the panel advances, contact 60 starts the sewing at the edge of the cover 31, contact 61 de-energizes the solenoid, contact 58 causes the solenoid to again be energized to stop the sewing, and contact 59 deenergizes the solenoid. This arrangement enables the advancing trim-panel to automatically control the operation of the sewing heads.

The solenoid operated clutch E', shown in Figs. 6 and 8-12 will now be described. The driving half of the clutch 69 is suitably journalled in a thrust bearing 70 and is driven by the drive mechanism D⁴ through a worm gear 71. The driven portion of a clutch 72 is fixed on a sleeve 73 which is splined to shaft 43. The clutch is supported on a standard 74 secured to a cross bar A². A brake drum 75 is journalled on the shaft 43 and is provided with clutch teeth to engage cooperating teeth 73a at the left end of the sleeve 73, as viewed in Fig. 8, to slow down the rotation of the driven parts when the clutch is disengaged. The device is provided with a suitable brake band 75$^a$ which is adjustably secured to the standard 74 by means of a machine screw 75$^b$, as shown in Fig. 8.

The sleeve 73 is provided with a flange 76 provided with a pair of notches 76$^a$ which are adapted to be engaged by a roller 77 fixedly journalled on the standard 74. Thus it will be seen that when the driven half of the clutch 72 is thrown into engagement with the driving head 69 it cannot be released from driving engagement until the half turn is completed to permit the roller 77 to engage the other notch 76$^a$. The roller also assures the stopping of the shaft 43 in its proper angular position.

Because of the rapid rotation of the shaft, it is not practical to have the solenoid become energized and de-energized before the shaft has made a half turn and additional means are desirable to allow the sleeve 73 to move back to disengaged position. For this reason, a collar 78 is journalled on the sleeve 73 and has two lugs 78$^a$ on the rear, or left face, and two lugs 78$^b$ on its front face (see Figs. 11 and 12). The driven half of the clutch 72 is provided with a circular groove 72$^a$, adjacent to the collar, and into which the lugs 78$^b$ on the collar extend. A pair of fixed pins 72$^b$ project from the head 72 into the groove 72$^a$ and normally the lugs 78$^b$ are held against said pins by compression springs 79.

The sleeve 73 is actuated by a clutch throwout yoke 80 which is pivoted to the standard 74, as indicated at 80$^a$. As shown in Fig. 11, the yoke is provided with an inwardly extending rounded finger 80$^b$ and a diametrically opposed inwardly extending block 80$^c$ which is substantially square in cross-section. The finger 80$^b$ and the block 80$^c$ normally engage and bear against the lugs 78$^a$ of the collar 78, as shown in Fig. 11. However, when the clutch is thrown into engagement and the collar 78 rotates, the finger 80$^b$ and block 80$^c$ slip off of the lugs 78$^a$ and the sleeve 73 is free to move to the left when the roller 77 reaches the next notch 76$^a$.

The collar 78 is held from further rotation when the block 80$^c$ engages the edge of one of the lugs 78$^a$ on the collar 78. However, as the clutch is still engaged, the driven head 72 continues to be turned against the compression-springs 79. After roller 77 drops into one of the notches 76$^a$, the clutch becomes disengaged, the solenoid has been de-energized, and the springs 79 will push the lugs 78$^b$ back into engagement with the pins 72$^b$, returning the parts to a new starting position. Thus it will be seen that the driven half of the clutch is turned through 180° but the collar is stopped after about 150° of movement and turns the remaining 30° after the solenoid is de-energized. As shown in Fig. 8, a tension-spring 62$^a$ tends to throw the clutch out of engagement when the master solenoid circuit is broken. Also, a compression-spring 81 is disposed between the clutch heads 69 and 72 to urge the head 72 out of engagement with the driving head 69 and to urge the rear end of the sleeve into engagement with the brake drum 75 to stop the sleeve from turning.

As shown in Figs. 1, 3 and 7, the forming rolls F are mounted on a shaft 82, in rear of the sewing-mechanism and driven by the socket chain D$^3$ in timed relation to the rest of the machine.

The idler presser rolls G are mounted on a cross shaft 83 provided at its ends with journal blocks 84 which are slidably mounted in vertical slots 85 provided in the standards A', as shown in Fig. 1. The rolls G cooperate with the conveyers B' to advance the trim-panels to the conveyer B$^2$.

The sewing heads are provided with threads 86 drawn from spools 87 mounted on a shelf 88 above the presser rolls G and, as shown in Figs. 1, 6 and 7, the threads pass through eyes 89 provided at the top of the machine, down through a guide bar 90, fixed to a cross bar at the top of the machine, through thread guides 91 and tensioning devices C$^4$, to the sewing needles 34. Looper-needle threads 92 are drawn from spools 93 beneath the sewing-mechanism, through a tensioning device 94 and a guide 95, as will be readily understood by reference to Figs. 1 and 7.

The trim panel H illustrated in Figs. 22–23 comprises a cardboard panel-plate 96 upon which is superposed cotton padding 97 and a cover fabric 98. Before this assembly is brought to the machine, the main portion of the panel-plate 96 has its upper surface coated with a suitable adhesive to hold the cotton padding 97 thereon. The lateral edge portions of the cover are turned under the panel-plate and are adhesively secured thereto, as indicated at 98$^a$. However, the cover fabric does not extend to the full length of the panel-plate but a free marginal portion 96$^a$ is provided to which is secured a kick pad 99, after the trim-panel leaves the machine. The kick pad may be applied by means of stitching 99$^a$ and a binding strip 99$^b$. Also, the top of the trim panel may be provided with a bolster 100 which is stitched to the assembly, as indicated at 100$^a$ and its top edge portion is turned under the panel-plate and adhesively secured thereto, as indicated at 100$^b$.

It may be noted that the machine is adapted to make trim panels of various sizes. For example, the contact fingers 58, 59, 60 and 61 are slidably mounted in a T-shaped slot 101 disposed beneath the bed plate of the machine 102 so that they may be moved longitudinally of the machine to accommodate various lengths of panels. Also, additional looper-needles and sewing needles may be installed and the looper-needles and sewing heads are laterally adjustable on the shafts C', 43, cross bar A$^2$, and looper-needle shaft D$^{13}$.

*Operation*

Trim panels H having panel-plates, partially covered with cotton padding 97 and the cover fabric 98, are placed between the shoes 26 and the conveyer channels B'. The rollers F press the panel-plate into engagement with the pins on the conveyers and it is advanced into sewing position beneath the needles 34. The sewing needles are held retracted while the contact fingers 58 and 59 are depressed by the advancing panel but when contact finger 60 is depressed, the master solenoid 62 is energized, throws the clutch E' into engagement with the driving mechanism and causes eccentrics 44 to rotate 180°. This movement releases the roller-wedge device C$^3$ and causes the coupler C$^2$ to make driving engagement between the needle-bar 33 and the shaft 37$^b$. It may be noted that the sewing does not start at the front edge of the panel-plate but begins as the superposed cover fabric reaches the sewing needle. As the panel advances further, contact finger 61 is moved to deenergize the solenoid but the sewing continues until the rear edge of the panel permits contact 58 to close its circuit and re-energize the solenoid to cause another 180° rotation of the eccentrics 44. This action retracts the sewing needles from the trim panel and when the rear edge of the panel clears contact finger 59, the solenoid is again de-energized to prevent its being burned out.

It may be noted that by skipping the sewing at the front and rear marginal portions of the panel-plate, the plate is not weakened by useless perforations and needless sewing and resulting waste of thread is avoided. In order to accomplish this it is necessary that the needles be held retracted from the trim panel so that the needles will not be broken. In the embodiment illustrated, the plungers 37$^b$ operate continuously and the sewing bars 33 are released from driving engagement by the coupler C$^2$. Of course, the sewing heads might be raised bodily from sewing engagement with the trim-panel and permitted to continue to reciprocate, but by using the construction illustrated, there are no lost stitches.

The foregoing detailed description has been given for clearness of understanding only, and no unnecessary limitations should be understood therefrom, but the appended claims should be construed as broadly as permissible, in view of the prior art.

We claim:

1. Apparatus for the purpose set forth, comprising mechanism for advancing panel-plates provided with panel-covers to and past sewing position; sewing mechanisms, including reciprocable needles operatively positioned adjacent said advancing mechanism, for sewing said panel-covers to said panel-plates; and control-means controlled by the panel-plates for regulating the operation of said sewing needles comprising mechanism for holding the sewing needles from fabric-engaging position, a clutch for operating said holding mechanism, and spaced fingers disposed in the path of the panel-plates for controlling the operation of said clutch.

2. In the manufacture of trim panels, a method which comprises: applying panel-covers to panel-boards and adhesively joining the margins of the panel-covers to the panel-plates; and then continuously feeding the cover-equipped panels seriatim through a gang sewing-machine which serves to sew lines of stitchings through the panel boards and their covers, the operation of the needles being suspended while the advance margins and rear margins of the panels are passing the needles.

3. A method as set forth in claim 2, in which the advance portions and rear portions of the panels, respectively, control the starting and the stopping of the operation of the needles.

4. Apparatus of the character set forth comprising; reciprocable needles for stitching panel covers of the panel plates; driving mechanism for operating said needles; conveyors for advancing said panel plates to and past sewing position seriatim; means for driving said conveyors and needles in a timed relation; and means for automatically retracting and holding the sewing needles retracted during the interval in which said panel covers are not passing the sewing needles, said last mentioned means comprising an eccentric adapted to be driven a half turn during each operation by a clutch connected to the driving mechanism.

5. Apparatus of the character set forth comprising; reciprocable needles for stitching panel covers of the panel plates; driving mechanism for operating said needles; conveyors for advancing said panel plates to and past sewing position seriatim; means for driving said conveyors and needles in a timed relation; and means for automatically retracting and holding the sewing needles retracted during the interval in which said panel covers are not passing the sewing needles, said last means comprising an eccentric adapted to be driven a half turn during each operation by a clutch connected to the driving mechanism, and additional means to lock said clutch in engaged position during said operation and lock part of the clutch against further turning movement after completing said half turn.

6. Apparatus of the character set forth comprising a conveyor, sewing mechanism operably related to said conveyor for sewing articles on said conveyor, means responsive to travel of articles on said conveyor for controlling said sewing mechanism, said means comprising an eccentric cooperating with said sewing mechanism, a constantly rotating power shaft, a clutch for connecting said power shaft to said eccentric for a half turn, shifting means movable to one position to engage said clutch, means for preventing release of said clutch for said half turn, and means for disengaging said clutch after a half turn irrespective of the position of said shifting means.

7. Apparatus of the character set forth comprising a conveyor, sewing mechanism operably related to said conveyor for sewing articles on said conveyor, means responsive to travel of articles on said conveyor for controlling said sewing mechanism, said means comprising an eccentric cooperating with said sewing mechanism, a constantly rotating power shaft, a clutch for connecting said power shaft to said eccentric for a half turn, shifting means movable to one position to engage said clutch, and means for disengaging said clutch after a half turn irrespective of the position of said shifting means.

8. In a device of the character described, an article conveyor, sewing mechanism positioned to operate on articles on said conveyor, control means for said sewing mechanism, and actuating means including a solenoid for actuating said control means, said actuating means also including a pair of switches adjacent said conveyor in position to be engaged by articles on said conveyor, said switches being positioned on opposite sides of said sewing mechanism and being adjustable along the conveyor, engagement of the leading edge of an article with the first switch having no effect on said sewing mechanism, engagement of the leading edge of an article with the second switch initiating sewing, and separation of the trailing edge of an article from said first switch terminating sewing.

9. In the manufacture of trim panels, the method which comprises: applying panel-covers to panel-boards; continuously feeding the cover-equipped panels successively past a sewing machine adapted to sew lines of stitching through the panel-boards and their covers; and retaining the needls of the sewing machine inoperative and in position to clear the panels while the advance and rear margins of the panels are passing the needles, and operating said needles to sew said panels while the central portions of said panels are passing the needles.

ALLISTER S. MITCHELL.
CLARENCE J. DAVIES.
HAROLD M. RATLEY.